United States Patent
Padilla-Acevedo et al.

(10) Patent No.: US 9,057,002 B2
(45) Date of Patent: *Jun. 16, 2015

(54) CURABLE RESIN COMPOSITIONS

(75) Inventors: Angela I. Padilla-Acevedo, Lake Jackson, TX (US); Ludovic Valette, Lake Jackson, TX (US); Michael J. Mullins, Houston, TX (US); Kandathil E. Verghese, Lake Jackson, TX (US); Mark B. Wilson, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/236,933

(22) PCT Filed: Jul. 18, 2012

(86) PCT No.: PCT/US2012/047141
§ 371 (c)(1),
(2), (4) Date: Feb. 4, 2014

(87) PCT Pub. No.: WO2013/025303
PCT Pub. Date: Feb. 21, 2013

(65) Prior Publication Data
US 2014/0186536 A1    Jul. 3, 2014

Related U.S. Application Data

(60) Provisional application No. 61/524,910, filed on Aug. 18, 2011.

(51) Int. Cl.
*C09D 137/00* (2006.01)
*C08J 5/24* (2006.01)
*C08G 59/22* (2006.01)
*C08G 59/50* (2006.01)
*C08G 59/56* (2006.01)
*C08L 63/00* (2006.01)
*C09D 163/00* (2006.01)

(52) U.S. Cl.
CPC ............. *C09D 137/00* (2013.01); *C08J 5/24* (2013.01); *C08G 59/226* (2013.01); *C08G 59/50* (2013.01); *C08G 59/56* (2013.01); *C08L 63/00* (2013.01); *C08L 2205/02* (2013.01); *C08J 2363/00* (2013.01); *C09D 163/00* (2013.01)

(58) Field of Classification Search
None
See application file for complete search history.

(56) References Cited

U.S. PATENT DOCUMENTS

2010/0044090 A1* 2/2010 Endo .............................. 174/260
2010/0222461 A1   9/2010 Bongiovanni et al.
2010/0261837 A1* 10/2010 Gan ............................... 524/590

FOREIGN PATENT DOCUMENTS

WO     2008019149     2/2008

OTHER PUBLICATIONS

Nair et al., Dual-Cure Propargyl Novolac-Epoxy Resins: Synthesis and Properties, Polymers & Polymer Composites 2004, 12, 43-53.

* cited by examiner

*Primary Examiner* — Erma Cameron
(74) *Attorney, Agent, or Firm* — Joe R. Prieto

(57) ABSTRACT

A curable epoxy resin composition including (a) at least one epoxy resin; and (b) at least one hardener; wherein the curable epoxy resin composition has at least two exotherm peaks representing at least two distinct chemical reactions and wherein the exothermic peak difference of the two exotherm peaks is sufficient to allow the curable epoxy resin composition of being B-staged.

14 Claims, 9 Drawing Sheets

CURABLE RESIN COMPOSITIONS

CROSS REFERENCE TO RELATED APPLICATIONS

This is a §371 application of PCT International Patent Application Number PCT/US2012/047141 filed Jul. 18, 2012, and claims priority from provisional application Ser. No. 61/524,910 filed Aug. 18, 2011, each of which is incorporated herein by reference in its entirety.

FIELD

The present invention relates to a curable resin composition for use in various processes. More specifically, the present invention relates to a B-stageable, curable epoxy resin composition for use in processes such as for example manufacturing prepregs and laminates.

BACKGROUND

Typically, printed circuit boards are prepared by stacking a plurality of prepregs in various arrangements, followed by pressing at high temperatures (e.g., greater than 170° C.). The prepregs consist of a partially cured curable resin coated onto fiber reinforcement, typically glass. A "partially cured" curable resin is known in the art as a "B-staged" resin. This partial curing or "B-staging," raises the glass transition temperature (Tg) of the thermoset above ambient temperature (20° C. to 30° C.); whereby the Tg can be from 30° C. to 100° C. so that the prepregs can be rolled up without sticking. When the prepregs are stacked, pressed, and heated to achieve final cure the resin can flow to consolidate the layers before final cure (typically, final cure occurs when the Tg of the composition does not vary by more than 5° C. as measured by differential scanning calorimetry).

The ability to B-stage a resin is essential to the process of manufacturing printed circuit boards. A B-staged resin is a resin that has a portion of its curable moieties reacted for example, anywhere from 1 mol % to 95 mol %, of the resin's curable moieties; and wherein the "gel point" of the resin has not been reached. (The gel point is defined as the point at which a liquid formulation resin begins to exhibit elastic properties and increased viscosity). The "gel point" of a curable resin is the point along the cure profile at which an infinite network forms. Although further cure can occur, the resin will no longer flow. A B-staged resin can melt and flow during subsequent processing and further heating. During this latter process, called "C-staging" or "final cure", the resulting thermoset is crosslinked beyond the 'gel point' and will no longer flow. At this C-stage, for example, typically more than 90 mol % of the curable moieties of the resin have reacted.

There continues to be a need for B-staging curable resins for prepreg production in a multistage process. Current B-staging processes include promoting polymerization reaction of part of the resin starting material and suspending the polymerization reaction at an appropriate B-stage. A notable drawback to this process is lack of reproducibility to consistently reach the same B-stage or the same degree of polymerization.

For example, in the aerospace and sporting goods industry, where prepregs are typically made with carbon fibers, a process is used which involves using a hot-melt technique in order to impregnate the fibers with resin. The thickness of the prepreg is finely controlled by using calender rollers. No solvent is used in this process as structural composites made using these prepregs needs to be below a certain void content such as typically, <1%. The prepreg produced in this manner undergoes little cure (e.g., <30% of the reactive moieties) during the prepregging process. The level of tack of this prepreg is controlled primarily by controlling the viscosity of the starting formulation at the prepregging temperature and the storage temperature. The main disadvantage of this type of prepreg is the need to transport the prepreg in refrigerated or cryogenic containers in order to prevent the tacky prepreg from undergoing further cure. Continued cure results in a loss of tackiness as well as causes issues during the subsequent laminate cure. In addition, once the prepreg needs to be used, the prepreg has to be warmed up back up to ambient temperature which adds additional work (and cost) to the process cycle. Most often these prepregs are stacked in specific stacking sequences depending on the design requirements for a specific use; and then the prepregs are cured in an autoclave under heat and pressure. It would therefore be advantageous to provide a resin composition that can be used to form a tacky prepreg that is storage stable at ambient temperature. Typically, a storage stable resin composition includes a B-stageable material that will not continue to significantly crosslink during storage so as to facilitate shipping at ambient temperature.

In an attempt to provide a formulation to satisfy the needs of the industry, dual-cure formulations have been described in the prior art which involve the use of two different types of polymerization, such as radical addition and condensation polymerization. The formulations need to be exposed to two different stimuli such as thermal energy and electromagnetic radiation including ultraviolet, electron beam or microwave radiation. The dual-curing formulations usually require a blend of a heat activated curing agent, and at least one polyolefinically unsaturated monomer such as a polyacrylate curable by a UV source. Other formulations include components that have the required functionalities of the dual-curing formulation incorporated in the same polymer backbone.

For example, Nair, et al., "Dual-Cure Propargyl Novolac-Epoxy Resins: Synthesis and Properties," Polymers & Polymer Composites 2004, 12, 43-53, describes a dual cure thermoset by reactive blending a partially propargylated oligomeric phenolic novolac (PPN) resin with an epoxy resin. Curing of the resin occurs through a phenol-epoxy reaction at 135° C. together with a Claisen rearrangement and the addition polymerization of propargyl ether groups at 235° C.

WO 2008/019149 A1 describes a composition that includes a first and a second curable material which are cured at a first and a second curable temperature, respectively. The first curable material includes an alcohol and an anhydride that may cure by heating to a particular first temperature, at which temperature the second curable material may not cure. Also, in this case, the type of energy (thermal or electromagnetic) and the amount of energy applied may or may not differ. Typically the second temperature range for the second reaction requires significantly higher temperature ranges which may be detrimental to certain compositions making the application of such process impracticable.

US 2010/0222461 A1 describes a polymer composition that includes an epoxy resin system and a dual curing system including one or more curing agents containing one or more hydrazine-based curing agents and one or more amine-based curing agents containing one or more amine functional groups. The hydrazine-amine curing system enables the polymer composition to achieve elevated levels of gellation or degree of cure at lower temperatures than are achievable with amine functional curing agents alone.

SUMMARY

The present invention advantageously provides a "more practical approach" to preparing compositions useful for prepreg and laminates; and include for example, a composition that has a low viscosity (for example, <10,000 mPa-s when measured at 25° C.) and that has a cure mechanism that proceeds in two stages wherein the two stages have substantially different rates. This "de-coupling reaction composition" allows for some variations during the prepreg process while maintaining robustness and consistency during the pressing process.

In one embodiment, the present invention is directed to a B-stageable, low viscosity curable epoxy resin composition including a mixture of: (a) at least one epoxy resin; and (b) at least one hardener; wherein the curable epoxy resin composition has at least two exotherm peaks representing at least two distinct chemical reactions and wherein the exothermic peak difference of the two exotherm peaks is sufficient to allow the curable epoxy resin composition of being B-staged.

In another embodiment, the at least one epoxy resin, component (a) of the composition of the present invention, may comprises (a1) at least a first epoxy resin; and/or (a2) at least a second epoxy resin different from the first epoxy resin.

In still another embodiment, the at least one hardener, component (b) of the composition of the present invention, may comprise (b1) at least a first hardener, and/or (b2) at least a second hardener different from the first hardener.

BRIEF DESCRIPTION OF THE DRAWINGS

The present invention may be illustrated by, but not limited thereto, the drawings herein wherein.

DESCRIPTION

Figure 1:
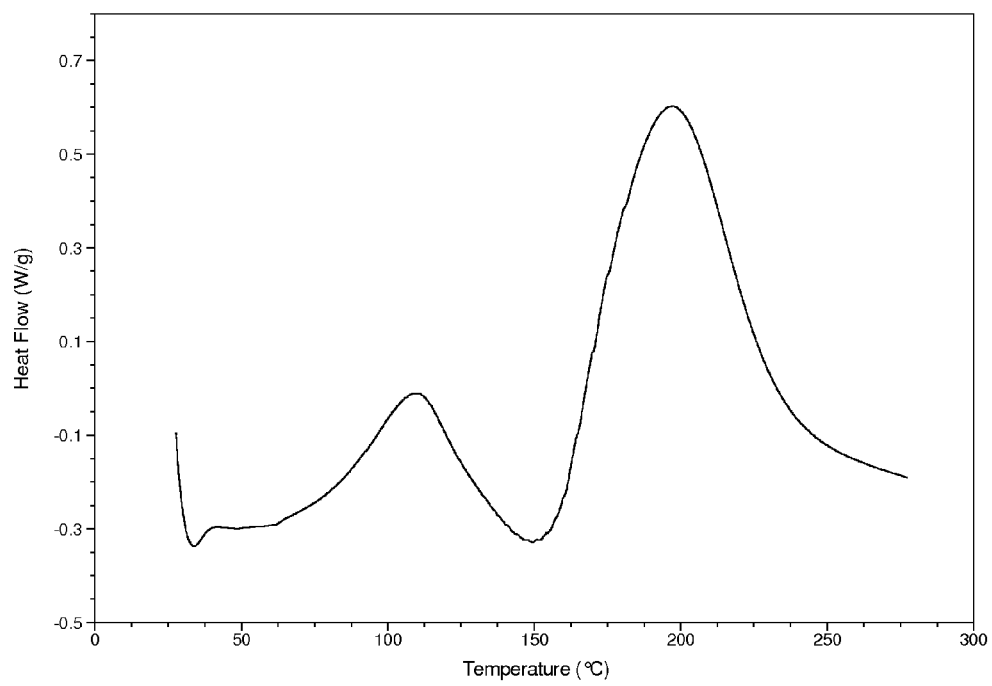
FIG. 1 is a thermogram via differential scanning calorimetry (DSC) of an example of a composition of the present invention starting with a mixture of divinylbenzene dioxide (DVBDO), diethylene triamine (DETA), and diethyltoluenediamine (DETDA).

"A-stage" with reference to describing a composition herein, refers to a composition, when prepared, is at an initial point where no reaction has taken place.

"B-stage" with reference to describing a composition, refers to a point where a first reaction of a composition has taken place or for example when a first reaction between an epoxide resin and at least one hardener is complete.

"A-to-B-stage" with reference to describing a composition herein, refers to pre-pregging, or partial curing a curable composition before reaching gellation of the composition.

"B-stageable" with reference to describing a composition herein, refers to a composition that is capable of being B-staged, i.e., a composition that can be put through a prepregging or partial curing process to form a B-stage composition.

"C-stage" with reference to describing a composition herein, refers to a point where all reactions in a composition have reached completion. For example, at this point most of the epoxides present in a curable composition are consumed.

"B-to-C-stage" with reference to describing a composition herein, refers to fully curing a curable composition leading to gellation and to the formation of a cross-linked thermoset.

A "dual-cure technology" or a "dual-cure composition" refers to a composition containing two distinct curing reactions (or "two distinct chemical reactions") that occur at different temperatures. In the present invention, the temperature difference is characterized by the difference between peak exotherms in a differential scanning calorimeter scan. For example, the composition of the present invention is capable of undergoing a B-staging reaction and a C-staging reaction, wherein the B-staging reaction and the C-staging reaction are two distinct chemical reactions.

"Thermally decoupled" herein refers to the ability of a dual-cure composition to be B-staged by heating to a temperature at which only one of two curing reactions occurs.

In its broadest scope, the present invention includes a curable (also referred to as thermosetting or crosslinkable) resin composition (also referred to as a system, mixture, or formulation) including (a) at least one epoxy resin, for example the at least one epoxy resin may include a first and/or second epoxy resin; and (b) at least one hardener, for example the at least one hardener may include a first and/or second hardener.

In general, the composition of the present invention includes (i) (a) two or more epoxy resins; and (b) at least one hardener; or (ii) (a) at least one epoxy resin; and (b) two or more hardeners. For example, in one embodiment, the composition may include the following components: (a1) at least a first epoxy; (a2) at least a second epoxy, and (b) at least one hardener; and in another embodiment, the composition may include the following components: (a) at least one epoxy; (b1) at least a first hardener, and (b2) at least a second hardener.

In addition, the present invention is directed to a B-stageable, low viscosity epoxy curable resin composition that exhibits at least two distinct exotherm peaks representing at least two distinct chemical reactions, as measured by DSC; wherein the exothermic peak difference of the two exotherm peaks is sufficient to allow the curable epoxy resin composition of being B-staged. In other words, the present invention includes a curable composition that exhibits two different curing mechanisms as shown by the at least two distinct exotherm peaks and the exothermic peak difference of the two exotherm peaks, as measured by DSC.

The two curing mechanisms are essentially two separate epoxy-hardener reactions which take place at two different temperatures—a first low curing temperature ($T_1$) and a second high curing temperature ($T_2$), wherein the low temperature $T_1$ is not equal to the high temperature $T_2$ and wherein the high temperature $T_2$ is higher than the low temperature $T_1$. The low temperature curing reaction at temperature $T_1$ enables a convenient way to produce a stable prepreg (B-stage), whereas the high temperature curing reaction at temperature $T_2$ can be useful for the final cure to produce a thermoset network (C-stage).

The exothermic peak difference of the two exotherm peaks exhibited by the composition, may include, for example, exotherms separated by an exothermic peak difference of at least greater than or equal to ($\geq$)20° C. in one embodiment; at least $\geq$30° C. in another embodiment; and at least $\geq$40° C. in still another embodiment, when measured with a heating rate of 10° C./minute; and wherein the composition has an initial viscosity of less than 100,000 mPa-s when measured at the processing temperature of the B-stageable composition.

As aforementioned, the present invention provides a curable composition capable of producing a prepreg or a B-staged material which comprises a first composition with a lower curing temperature $T_1$ and a second composition with a higher curing temperature $T_2$, where $T_1 \neq T_2$ and $T_2 > T_1$. The "B-stageable curable resin composition" (or "dual-cure formulation") exhibits two distinct ranges of reaction—a first reaction that takes place at a low temperature and a second reaction that takes place at a high temperature. In the present invention, the reactions are "thermally decoupled" by conducting the B-stage prepregging at a lower temperature independently from a final cure taking place at a higher temperature. The ability to thermally decouple the composition results in improved processability of the composition including the use of a wider range of processing conditions such as longer running times in a treater during prepreg manufacturing (running time can be for example $\geq$30 minutes).

In one embodiment, the temperature range where the two different curing mechanisms (the low and high temperature reactions) take place may range generally from 25° C. to 300° C. (temperature ranges measured by DSC). In another embodiment, the range for the exotherm peak separation of the two reactions taking place may be between 30° C. and 150° C.

Generally, $T_1$ is greater than or equal to 10° C. and less than $T_2$ in one embodiment. In another embodiment, $T_2$ may range between 0° C. and 180° C.; between 10° C. and 150° C. in still another embodiment; and between 20° C. and 120° C. in yet another embodiment.

Generally, $T_2$ is greater than 20° C. and less than 300° C. in one embodiment. In another embodiment, $T_2$ may range between 80° C. and less than 300° C.; between 120° C. and 250° C. in still another embodiment; and between 150° C. and 200° C. in yet another embodiment.

The dual-cure composition of the present invention that exhibits a decoupling of reactions at two different temperatures may include a dual-cure composition that exhibits a shoulder or an overlap in the partition of exotherms at the A-stage as shown in a DSC scan. In spite of this overlap of exotherm peaks, the reactions are "thermally decoupled" by conducting the B-stage prepregging at a lower temperature independently from a final cure taking place at a higher temperature.

The B-stageable curable resin composition of the present invention advantageously allows the composition to be B-staged via "thermal decoupling" of the reactions taking place at two separate and different temperatures $T_1$ and $T_2$. Also, advantageously the prepreg is stable after holding for long periods of time at $T_1$ without the resin reaching gellation (for example, the prepreg may remain stable for $\geq$5 minutes in one embodiment; $\geq$10 minutes in another embodiment; $\geq$20 minutes in still another embodiment; and $\geq$30 minutes in yet another embodiment). These advantageous results of the present invention compositions are an improvement over conventional formulations because conventional formulations can turn from a low viscosity liquid to a gel within minutes such as described in R. B. Roller, *Rheology of Curing Thermoset: A Review*, Polymer Eng. & Sci., 1986, 26 (6), pp. 432-440. Conventional formulations work well for curing processes in which the monomers are converted to a finished part in one step, such as for castings and potting. However, conventional formulations are not suitable for processes that require a B-staged intermediate.

The curable resin composition of the present invention may include one or more epoxy resins as component (a). Epoxy resins are those compounds containing at least one vicinal epoxy group. The epoxy resin may be saturated or unsaturated, aliphatic, cycloaliphatic, aromatic or heterocyclic and may be substituted. The epoxy resin may also be monomeric or polymeric. The epoxy resin useful in the present invention may be selected from any known epoxy resins in the art. An extensive enumeration of epoxy resins useful in the present invention is found in Lee, H. and Neville, K., *Handbook of Epoxy Resins*, McGraw-Hill Book Company, New York, 1967, Chapter 2, pages 257-307.

The epoxy resins, used in embodiments disclosed herein for component (a) of the present invention, may vary and include conventional and commercially available epoxy resins, which may be used alone or in combinations of two or more. In choosing epoxy resins for compositions disclosed herein, consideration should not only be given to properties of the final product, but also to viscosity and other properties that may influence the processing of the resin composition.

Particularly suitable epoxy resins known to the skilled worker useful in the present invention are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known to the skilled worker include reaction products of epichlorohydrin with o-cresol and, respectively, phenol novolacs. It is also possible to use a mixture of two or more epoxy resins.

In another embodiment, the epoxy resin useful in the present invention for the preparation of the epoxy resin composition may be selected from commercially available products. For example, D.E.R.® 330, D.E.R. 331, D.E.R. 332, D.E.R. 324, D.E.R. 352, D.E.R. 354, D.E.R. 542, D.E.R. 560, D.E.N.® 431, D.E.N. 438, D.E.R. 736, or D.E.R. 732 available from The Dow Chemical Company may be used. As an illustration of the present invention, the epoxy resin component (a) may be a liquid epoxy resin, D.E.R. 383 (diglycidyl ether of bisphenol A) having an epoxide equivalent weight (EEW) of 175-185, a viscosity of 9500 mPa-s, and a density of 1.16 g/cc.

Other suitable epoxy resins useful as component (a) in the present invention composition are disclosed in, for example, U.S. Pat. Nos. 3,018,262, 7,163,973, 6,887,574, 6,632,893, 6,242,083, 7,037,958, 6,572,971, 6,153,719, and 5,405,688, PCT Publication WO 2006/052727; U.S. Patent Application Publication Nos. 20060293172, 20050171237, 2007/0221890 A1.

Another embodiment of an epoxy resin useful as component (a) in the present invention composition may include one divinylarene dioxide; or two or more different divinylarene dioxides. The divinylarene dioxide useful in the present invention may comprise, for example, the divinylarene dioxides disclosed in WO/2010/077483. For example, the divinylarene dioxide useful in the present invention may comprise divinylbenzene dioxide, divinylnaphthalene dioxide, divinylbiphenyl dioxide, divinyldiphenylether dioxide, and mixtures thereof.

The concentration of epoxy resin used in the present invention may range generally from 10 weight percent (wt %) to 90 wt % in one embodiment; from 20 wt % to 80 wt % in another embodiment; from 30 wt % to 70 wt % in yet another embodiment based on the weight of the epoxy resin blend and the other composition ingredients, excluding inorganic components.

In another embodiment, the composition may have the following stoichiometric ratios of total epoxy resin to total hardener such as for example generally in the range of from 2:1 to 1:2 (epoxy:hardener) in one embodiment, from 1.8:1 to 1:1.5 in another embodiment, and from 1.7:1.0 to 1.0:1.2 in still another embodiment.

In general, at least one of the epoxy resins used the composition of the present invention, has a viscosity of between 1 mPa-s and 100,000 mPa-s in one embodiment, between 5 mPa-s and 50,000 mPa-s in another embodiment, between 10 mPa-s and 10,000 mPa-s in still another embodiment, and between 10 mPa-s and 1,000 mPa-s in yet another embodiment, at ambient temperature.

In another embodiment, at least one epoxy resin used as component (a) in the composition of the present invention may be selected from epoxy resins that have a dual role of being a reactant and a reactive diluent at ambient temperature.

In a broad scope of the present invention, at least one hardener is used in the composition of the present invention and in one embodiment two or more hardeners (curing agents or cross-linkers) are used in the composition of the present invention. For example, at least a first hardener, component (b1), and at least a second hardener, component (b2), may be used in the composition. Both the first hardener and the second hardener may be any hardener known in the art which is appropriate for curing epoxy resins, with the proviso that the first hardener is different from the second hardener.

The hardeners of choice used in the present invention may depend on the application requirements. Generally, the first and/or second hardeners useful in the present invention may be selected from, for example, but are not limited to, dicyandiamide, substituted guanidines, phenolic, amino, benzoxazine, anhydrides, amido amines, polyamides, polyamines, aromatic amines, carbodiimides, polyesters, polyisocyanates, polymercaptans, urea formaldehyde and melamine formaldehyde resins, and mixtures thereof.

In one embodiment, at least one hardener: component (b), may include one or more of aliphatic amines such as ethanolamine, ethylenediamine, diethylenetriamine (DETA), triethyleneaminetetramine (TETA), 1-(o-tolyl)-biguanide, dicyandiamide, amine-terminated polyols, aromatic amines such as methylenedianiline (MDA), toluenediamine (TDA), diethyltoluenediamine (DETDA), diaminodiphenylsulfone (DADS), polyphenols such as bisphenol A, bisphenol F, 1,1-bis(4-hydroxyphenyl)-ethane, hydroquinone, resorcinol, catechol, tetrabromobisphenol A, novolacs such as phenol novolac, bisphenol A novolac, hydroquinone novolac, resorcinol novolac, naphthol novolac, mercaptans such as mercaptan-terminated polysulfide polymers, Capcure (trademark of Cognis) hardeners, anhydrides such as phthalic anhydride, trimellitic anhydride, nadic methyl anhydride, methyl tetrahydrophthalic anhydride, methyl hexahydrophthalic anhydride; and mixtures thereof.

In one embodiment, the composition of the present invention may include a three-component composition, for example, a composition comprising two different epoxides and one hardener. For example, the composition may include an epoxy resin component (a) comprising a first epoxy resin and a second epoxy resin, wherein the first epoxy resin and the second epoxy resin each separately and individually may comprise for example two different epoxy resins selected from the epoxy resins described above; and a hardener component (b).

In another embodiment, the composition of the present invention may include a three-component composition, for example, a composition comprising one epoxide and two different hardeners. For example, the composition may include an epoxy resin component (a); and a hardener component (b) comprising a first hardener and a second hardener, wherein the first hardener and the second hardener each separately and individually may comprise for example two different hardeners selected from the hardeners described above.

In still another embodiment, the composition of the present invention may include a four-component composition, for example, a composition comprising two different epoxides and two different hardeners. For example, the composition may include an epoxy resin component (a) comprising a first epoxy resin and a second epoxy resin, wherein the first epoxy resin and the second epoxy resin each separately and individually may comprise for example two different epoxy resins selected from the epoxy resins described above; and a hardener component (b) comprising a first hardener and a second hardener, wherein the first hardener and the second hardener each separately and individually may comprise for example two different hardeners selected from the hardeners described above.

In the embodiment wherein at least two hardeners (a first hardener and a second hardener) are used, the molar ratio of the first hardener to the second hardener may be from 0.001 to 1000. In the curable composition of the present invention containing two different hardeners, i.e. wherein the first hardener does not equal the second hardener, the molar ratio of hardeners used in the composition may range generally from 0.01 wt % to 100 wt % in one embodiment; and from 100 wt % to 0.01 wt % in another embodiment, based on the weight of the composition ingredients.

In the embodiment wherein at least two epoxy resins are used, such as for example, wherein the composition includes a divinylarene dioxide as the first epoxy resin in combination with bisphenol A diglycidyl ether or epoxy novolac as the second epoxy resin; the viscosity of at least one of the epoxy resins used may be between 1 mPa-s and 100,000 mPa-s, between 5 mPa-s and 50,000 mPa-s in another embodiment, between 10 mPa-s and 10,000 mPa-s in still another embodiment, and between 10 mPa-s and 1,000 mPa-s in yet another embodiment, at ambient temperature.

In one embodiment of the present invention, the composition may optionally contain one or more solvents. For example, the composition may contain less than 50 wt % of at least one solvent or a mixture of solvents, less than 40 wt % in another embodiment, less than 30 wt % in still another embodiment, less than 20 wt % in yet another embodiment, and less than 10 wt % in one other embodiment, based on the weight of the epoxy resin blend and the other composition ingredients, excluding inorganic components. In another embodiment, the composition may optionally be essentially solvent-free.

Non-limiting examples of suitable solvents useful in the present invention may include ketones, alcohols, water, glycol ethers, aromatic hydrocarbons and mixtures thereof. In one embodiment, the solvent used in the present invention may include acetone, methyl ethyl ketone, methyl isobutyl ketone, cyclohexanone, methylpyrrolidinone, propylene glycol monomethyl ether, propylene glycol monomethyl ether acetate, ethylene glycol monomethyl ether, methyl amyl ketone, methanol, isopropanol, toluene, xylene, dimethylformamide (DMF), mixtures thereof. A single solvent may be used or separate solvents may be used for one or more of the components in the composition.

In another embodiment, solvents for the epoxy resins and curing agents may include ketones such as acetone, methylethyl ketone; and ether alcohols such as methyl, ethyl, propyl or butyl ethers of ethylene glycol, diethylene glycol, propylene glycol or dipropylene glycol, ethylene glycol monomethyl ether, or 1-methoxy-2-propanol, and the respective acetates, and mixtures thereof. In still another embodiment, solvents used in the composition of the present invention may include alcohols, ketones, water, dimethylformamide (DMF), glycol ethers such as propylene glycol monomethyl ether or ethylene glycol monomethyl ether, and combinations thereof.

The curable resin composition of the present invention may include at least one catalyst to facilitate the reaction of the epoxy resin compound with the curing agent. The catalyst useful as an optional component in the composition of the present invention may include catalysts well known in the art, such as for example, catalyst compounds containing amine, phosphine, heterocyclic nitrogen, ammonium, phosphonium, arsonium, sulfonium moieties, and any combination thereof. Some non-limiting examples of the catalyst of the present invention may include, for example, ethyltriphenylphosphonium; benzyltrimethylammonium chloride; heterocyclic nitrogen-containing catalysts described in U.S. Pat. No. 4,925,901, imidazoles; triethylamine; and any combination thereof.

The selection of the catalyst useful in the present invention is not limited to any particular catalyst; and commonly used catalysts for epoxy compositions can be used. Also, the addition of a catalyst to the composition of the present invention may depend on the composition prepared. For example, the catalyst may include tertiary amines, imidazoles, organophosphines, acid salts, and mixtures thereof.

In one embodiment, the catalyst may include tertiary amines such as, for example, triethylamine, tripropylamine, tributylamine, 2-methylimidazole, benzyldimethylamine, mixtures thereof.

The concentration of the optional catalyst used in the present invention may be less than 10 wt %; and generally from 0.01 wt % to 10 wt % in one embodiment, from 0.1 wt % to 5 wt % in another embodiment, from 0.2 wt % to 3 wt % in still another embodiment, and from 0.5 wt % to 2 wt % in yet another embodiment. Lower concentrations of catalyst typically do not provide sufficient catalytic effect, resulting in too slow reactivity of the compositions. Higher concentrations of catalyst typically result in too high reactivity of the compositions.

In one embodiment, the composition of the present invention will not typically contain a catalyst; however, when the curable composition of the present invention includes a catalyst as a component, the catalyst may be an organic acid catalyst; a Lewis acid catalyst; a polymer supported (polymeric beads) Lewis acid catalyst; or mixtures thereof.

Other optional components that may be useful in the present invention are components normally used in resin compositions known to those skilled in the art. For example, the optional components may comprise compounds that can be added to the composition to enhance application properties (e.g. surface tension modifiers or flow aids), reliability properties (e.g. adhesion promoters) the reaction rate, the selectivity of the reaction, and/or the catalyst lifetime. For example, the composition of the present invention may include a flame retardant, a toughening agent, a silica filler, or mixtures thereof.

An assortment of additives may be added to the composition of the present invention including for example, other resins such as epoxy resins that are different from the divinylarene dioxide, component (a), diluents, stabilizers, fillers, plasticizers, catalyst de-activators, and mixtures thereof.

Other additives useful in the composition of the present invention include for example, a halogen containing or halogen free flame retardant; a synergist to improve the performance of the flame extinguishing ability such magnesium hydroxide, zinc borate, or metallocenes; a solvent for processability including for example acetone, methyl ethyl ketone, an Dowanol PMA; adhesion promoters such as modified organosilanes (epoxidized, methacryl, amino), acetylacetonates, or sulfur containing molecules; wetting and dispersing aids such as modified organosilanes, Byk 900 series and Byk W-9010, modified fluorocarbons; air release additives such as Byk-A 530, Byk-A 525, Byk-A 555, Byk-A 560; surface modifiers such as slip and gloss additives (a number of which are available from Byk-Chemie); a reactive or non-reactive thermoplastic resin such as polyphenylsulfones, polysulfones, polyethersolufones, polyvinylidene fluoride, polyetherimide, polypthalimide, polybenzimidiazole, acyrlics, phenoxy, urethane; a mold release agent such as waxes; other functional additives or prereacted products to improve polymer properties such as isocyanates, isocyanurates, cyanate esters, allyl containing molecules or other ethylenically unsaturated compounds, and acrylates; and mixtures thereof.

The concentration of the additives used in the present invention may range generally from 0 wt % to 90 wt % in one embodiment, from 0.01 wt % to 80 wt % in another embodiment, from 0.1 wt % to 70 wt % in still another embodiment, and from 0.5 wt % to 60 wt % in yet another embodiment.

In one embodiment, when the curable composition of the present invention includes other additives as a component, the additive may be, for example, a flame retardant and fillers that provide flame retardancy; a toughening agent; at least one reinforcement material such as glass fibers or carbon fibers; a filler such as talc, calcium carbonate, silica or alumina; a thermally and/or electrically conductive material such as silver, graphite, carbon nanotubes, or boron nitride; and mixtures thereof. When a flame retardant is used in the composition, the cure thermoset can show a high level of flame retardancy characterized by UL94 V-2 ranking in one embodiment, a UL94 V-1 ranking in another embodiment, and a UL94 V-0 ranking in still another embodiment.

In one embodiment, a composition may contain a latent catalyst to lower the activation energy for the reaction of the second hardener with the second epoxide accompanied by the required decoupling of the reactions. "Activation energy" is the minimum amount of energy required to initiate a reaction.

In another embodiment, a composition of the present invention may be prepared with the appropriate compounds such that the composition is capable of providing a tacky prepreg at ambient temperature and then is capable of being stored stable at ambient temperature until such time the composition is cured into a laminate at an elevated temperature.

In a preferred embodiment, the composition of the present invention includes at least one reinforcement material to form a prepreg and/or a laminate. The reinforcement material can include for example glass fibers, carbon fibers, or mixtures thereof.

In the process of preparing a laminate one or more prepregs produced in accordance with the present invention are stacked followed by heat pressing the stack of prepregs to form a laminate.

In general, the process for preparing the epoxy resin composition of the present invention includes for example (i) admixing or blending (a) two or more epoxy resins; and (b) at least one hardener; or (ii) admixing or blending (a) at least one epoxy resin; and (b) two or more hardeners. For example, in one embodiment, the composition may include (a1) at least a first epoxy; (a2) at least a second epoxy, and (b) at least one hardener; and in another embodiment, the composition may include (a) at least one epoxy; (b1) at least a first hardener, and (b2) at least a second hardener.

In preparing the composition of the present invention, various optional compounds may be added to the composition, such as for example, a solvent, a cure catalyst: and/or other ingredients as needed. For example, the preparation of the curable epoxy resin composition of the present invention is achieved by blending with or without vacuum in a Ross PD Mixer (Charles Ross), divinylbenzene dioxide, a curing agent, a filler, a catalyst, and optionally any other desirable additives. Any of the above-mentioned optional assorted composition additives, for example an additional epoxy resin, may also be added to the composition during the mixing or prior to the mixing to form the composition.

All the components of the epoxy resin composition are typically mixed and dispersed at a temperature enabling the preparation of an effective epoxy resin composition having the desired balance of properties for prepregs and laminates applications. For example, the mixing temperature used in the present invention may be generally at or below the B-staging temperature. In one embodiment, the temperature of mixing may be at least 10° C. below the B-staging temperature, and 20° C. below the B-staging temperature in another embodiment. In still another embodiment, the temperature during the mixing of all components may be generally from 20° C. to 100° C. and from 25° C. to 90° C. in yet another embodiment. Lower mixing temperatures help to minimize reaction of the resin and hardener components to maximize the pot life of the composition.

In one embodiment wherein at least two hardeners are used in the composition, the components are mixed at ambient temperature. For example, when the composition is solvent free, and a solid first hardener is used, the solid compound may first be dissolved in the epoxy used, below curing temperature, and then the solution may be cooled to ambient temperature. In this embodiment, a second hardener that may start reacting at ambient temperature may be added to the solution containing the dissolved first hardener.

Generally, the curable composition of the present invention advantageously has a low viscosity. By "low viscosity" with reference to the curable composition of the present invention, it is meant that the composition has a viscosity of less than 100,000 mPa-s under processing conditions of the B-stageable composition in one embodiment; and less than 50,000 mPa-s under processing conditions of the B-stageable composition in another embodiment. For example, the viscosity of the curable composition of the present invention generally may be in the range of from 10 mPa-s to less than 100,000 mPa-s in one embodiment; from 100 mPa-s to less than 50,000 mPa-s in another embodiment; from 100 mPa-s to 10,000 mPa-s in still another embodiment; from 100 mPa-s to less than 5,000 mPa-s in yet another embodiment; from 100 mPa-s to less than 2,000 mPa-s in still one other embodiment; and from 100 mPa-s to less than 1,000 mPa-s in yet one other embodiment; wherein the viscosity is measured under the processing conditions of the B-stageable composition such as for example at ambient temperature.

The B-stageable curable resin composition of the present invention generally is processed via thermal cure. For example, the curing of the curable composition may be carried out at a predetermined temperature and for a predetermined period of time sufficient to partially cure the composition with the first hardener to produce a B-staged material. For example, the temperature of partially curing the composition may be generally from 0° C. to 180° C. in one embodiment; from 10° C. to 150° C. in another embodiment; and from 20° C. to 120° C. in still another embodiment; and the partial curing time may be chosen between 1 minute to about 24 hours in one embodiment, between 2 minutes to 2 hours in another embodiment, and between 3 minutes to 1 hour in still another embodiment. After the first partial curing of the composition, a B-staged material is formed.

In one embodiment a B-staged material is produced by partially curing a composition of the present invention wherein the curable moieties (e.g., epoxy functionalities) of the resin composition have been consumed, i.e. have been reacted. For example, generally from 1 mol % to 95 mol % of the resin's curable moieties have reacted in one embodiment, from 10 mol % to 80 mol % of the resin's curable moieties have reacted in another embodiment, and from 20 mol % to 70 mol % of the resin's curable moieties have reacted in still another embodiment.

In one preferred embodiment, a B-staged material is prepared from the composition of the present invention by partially curing a curable epoxy resin composition. For example, B-staging the composition includes partially curing the composition such that from 10 percent to 80 percent of the epoxy functionalities of the curable epoxy resin composition are consumed.

The continued curing of the thermosettable composition may be carried out at a predetermined temperature and for a predetermined period of time sufficient to completely cure the composition with the second hardener. For example, the temperature of second curing step of the composition may be generally from 80° C. to 300° C. in one embodiment; from 120° C. to 250° C. in another embodiment; and from 150° C. to 200° C. in still another embodiment; and the complete curing time may be chosen between 1 minute to 24 hours in one embodiment, between 2 minutes to 6 hours in another embodiment, and between 5 minutes to 2 hours in still another embodiment.

At the C-stage of a resin composition of the present invention, generally more than 70 mol % of the curable moieties of the resin composition have been reacted in one embodiment, more than 80 mol % of the curable moieties have reacted in another embodiment, and more than 90 mol % of the curable moieties of the resin have reacted.

As an illustration of one embodiment of the composition of the present invention, a DVBDO may be used as the epoxy resin of the present invention. The DVBDO may be used as the sole resin in the composition of the present invention to form the epoxy matrix in the final composition; or the DVBDO resin may be used in combination with a second epoxy resin such as any of the aforementioned conventional epoxy resins for example diglycidyl ether of bisphenol A or epoxy novolac to prepare the final composition. For example an epoxy resin may be used as an additive diluent. The use of DVBDO imparts improved properties to the curable composition and the final cured product over conventional glycidyl ether, glycidyl ester or glycidyl amine epoxy resins. The DVBDO's unique combination of low viscosity in the uncured state, and high Tg after cure due to the rigid DVBDO molecular structure and increase in cross-linking density, enables a formulator to apply new composition strategies.

In yet another embodiment, the composition of DVBDO and at least two different hardeners capable of being B-staged, wherein each of the two different hardeners contain an amine functionality; and wherein the exotherm peak difference (measured by DSC with a heating rate of 10° C./minute) can be ≥10° C. in one embodiment, ≥20° C. in another embodiment, ≥30° C. in still another embodiment, and ≥60° C. in yet another embodiment.

In yet one other embodiment, the composition may include DVBDO and at least two different hardeners wherein one of the hardeners contains an amine functionality and the other hardener contains a phenol functionality; and wherein the peak exotherm peak difference can be ≥10° C. in one embodiment, ≥20° C. in another embodiment, ≥30° C. still another embodiment, and at least ≥40° C. in yet another embodiment, when measured by DSC with a heating rate of 10° C./minute. In one embodiment of the present invention, the at least one hardener includes at least a first hardener and at least a second hardener different from the first hardener; wherein the curable resin composition undergoes at least two different curing mechanisms which take place at two different temperatures—one curing mechanism or reaction occurring at a first temperature comprising a low curing temperature $T_1$ and another curing mechanism occurring at a second temperature comprising a high curing temperature $T_2$, wherein $T_1$ is not the same as $T_2$ and $T_2$ is greater than $T_1$; such that the curable resin composition exhibits two distinct exotherms. In this embodiment, the two distinct exotherms are sufficient to allow the curable resin composition of being B-staged at least once at the first low temperature. In addition, the first and second hardeners have an exotherm peak difference separated by at least greater than or equal to (≥) 10° C. in one embodiment; ≥20° C. in another embodiment; and ≥30° C. in still another embodiment, as measured by DSC with a heating rate of 10° C./minute. In general, the curable resin composition has an initial viscosity of less than 10,000 mPa-s in one embodiment, <5,000 mPa-s in another embodiment, <2,000 mPa-s in still another embodiment, and <1,000 mPa-s in yet another embodiment when measured at 25° C.

The exotherm peak difference when measured by differential scanning calorimetry with a heating rate of 10° C./minute, of the composition of the present invention, is at least greater than or equal to 30° C. in one embodiment; and greater than or equal to 40° C. in another embodiment. The exotherm peak difference when measured by differential scanning calorimetry with a heating rate of 10° C./minute, of the composition of the present invention, is from 20° C. to 180° C. in one embodiment; from 30° C. to 150° C. in another embodiment; and from 80° C. to 100° C. in still another embodiment.

In one preferred embodiment, the Tg of the B-staged material produced from the composition of the present invention can be at least 30° C.; and the Tg of the C-staged material produced from the composition of the present invention can be at least 50° C.

Figure 2:
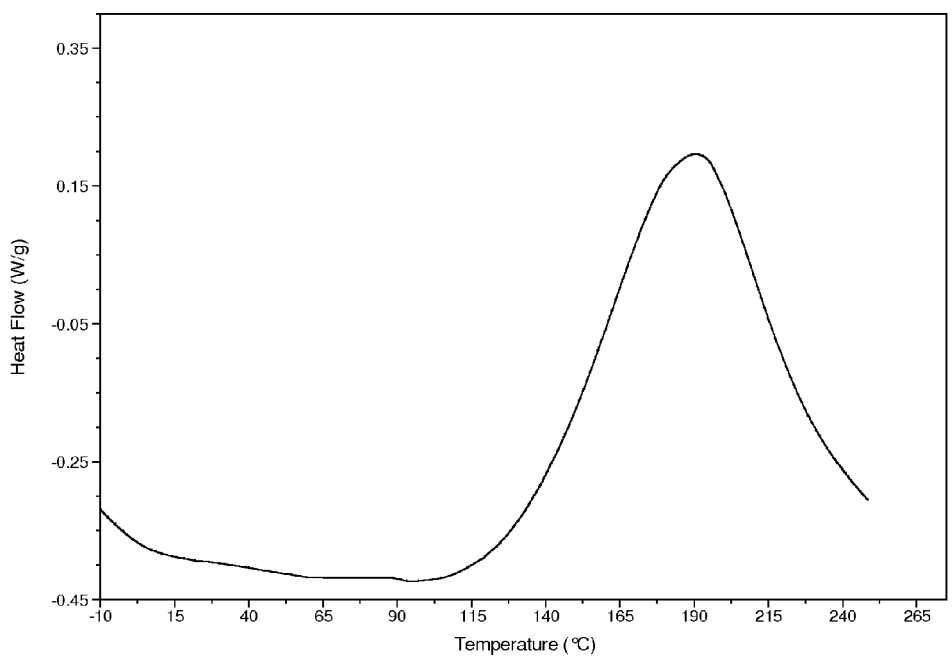
FIG. 2 is a thermogram via DSC of an example of a composition of the present invention starting with a mixture of DVBDO, DETA, and DETDA which has been preheated to 110° C. for 1 hour.
Figure 3:
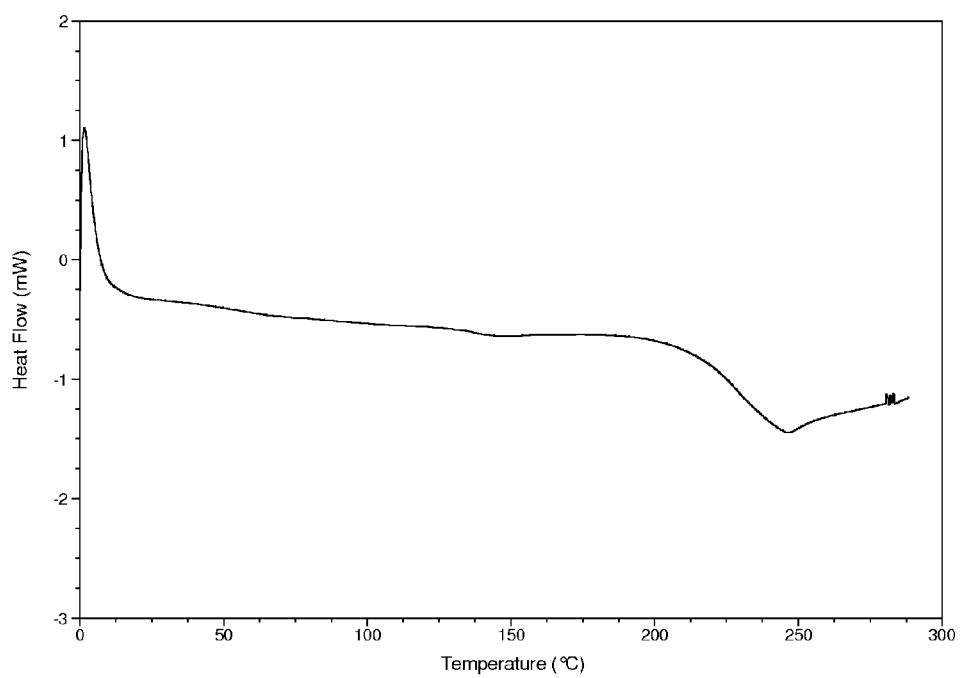
FIG. 3 is a thermogram via DSC of an example of a composition of the present invention starting with a mixture of DVBDO, DETA and DETDA which has been preheated to 110° C. for 1 hour and heated to 210° C. for 2 hours.

With reference to FIGS. 1-3, there is shown graphical illustrations of the stages of a composition of the present invention beginning with the A-stage of the composition going to the B-stage of the composition, and the B-stage of the composition going to the C-stage. FIG. 1 shows the characterization of the composition at the A-stage via DSC. FIG. 1 shows that at the A-stage two distinct ranges of reactions are present in the composition. At the B-stage, the spectra show the decoupling of the reactions via completion of the low temperature reaction during the A-stage to the B-stage reaction. The C-stage shows the formation of the thermoset network.

With reference to FIG. 1-3 again, there is shown a graphical illustration of a composition of the present invention of the characterization of the stages of the present invention via DSC. The first thermogram was conducted on a mixture of an epoxy (DVBDO) with two hardeners DETA and DETDA (it represents a typical mixture in the A-stage) that is heated at a rate of 10° C./minute from 30° C. to 275° C. The thermogram shows two exotherms at distinct temperatures, the low temperature exotherm with a peak at $T_1$=111° C. and the high temperature exotherm with a peak at $T_2$=196° C. The $2^{nd}$ thermogram is a similar temperature scan, but the sample has been preheated at 110° C. for 60 minutes to represent a typical B-stage material. Only one exotherm peak at high temperature (190° C.) is observed. The third thermogram was conducted on a fully cured sample (typically representing a C-stage material) after heating the sample at 210° C. for 120 minutes. No exotherm was observed on this scan.

With reference to FIG. 1, there is shown a thermogram via DSC of an example of the composition of the present invention starting with a mixture of DVBDO, DETA and DETDA. In the thermogram, the mixture is heated at a rate of 10° C./minute from 30° C. to 275° C. The thermogram shows two exotherms a distinct temperatures, the low temperature exotherm with a peak at $T_1$=111° C. and the high temperature exotherm with a peak at $T_2$=196° C.

With reference to FIG. 2, there is shown a thermogram via DSC of an example of the composition of the present invention starting with a mixture of DVBDO, DETA and DETDA which has been preheated to 110° C. for 1 hour (typically representing a B-stage material). Only one exotherm peak at high temperature (190° C.) is observed.

With reference to FIG. 3 there is shown a thermogram via DSC of an example of the composition of the present invention starting with a mixture of DVBDO, DETA and DETDA which has been preheated to 110° C. for 1 hour and heated to 210° C. for 2 hours (typically representing a C-stage material). No exotherm was observed on this scan.

Figure 4:
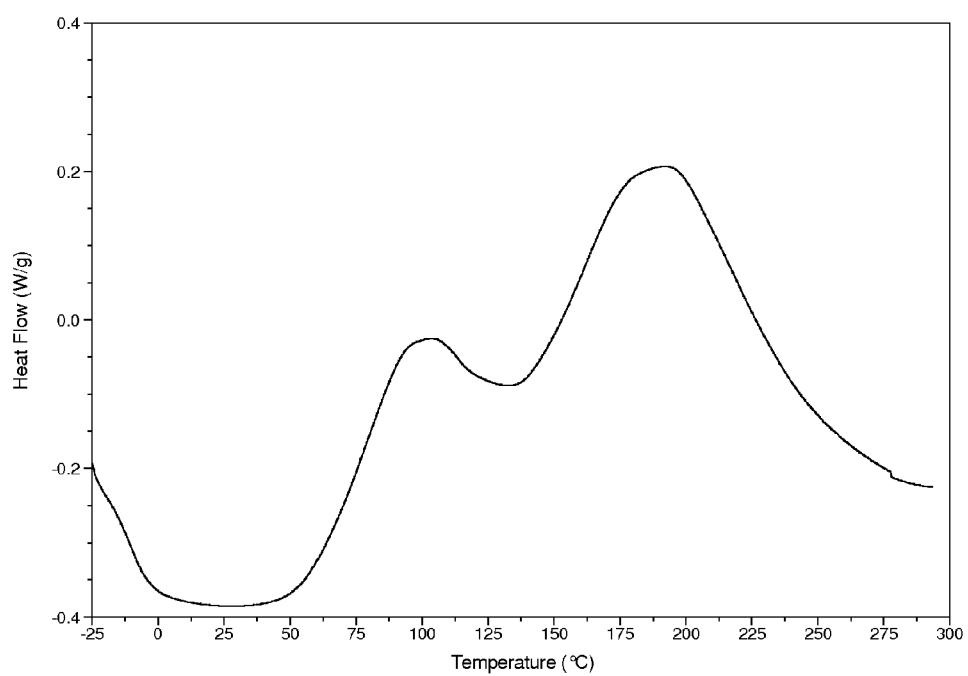
FIG. 4 is a thermogram via DSC of an example of a composition of the present invention starting with a mixture of DEN 438, DETA and DETDA

With reference to FIG. 4, there is shown a thermogram via DSC of the composition of the present invention starting with a mixture of DEN 438, DETA and DETDA. In the thermogram, the mixture is heated at a rate of 10° C./minute from −25° C. to 295° C. The thermogram shows two exotherms a distinct temperatures, the low temperature exotherm with a peak at $T_1$=103° C. and the high temperature exotherm with a peak at $T_2$=192° C.

Figure 5:
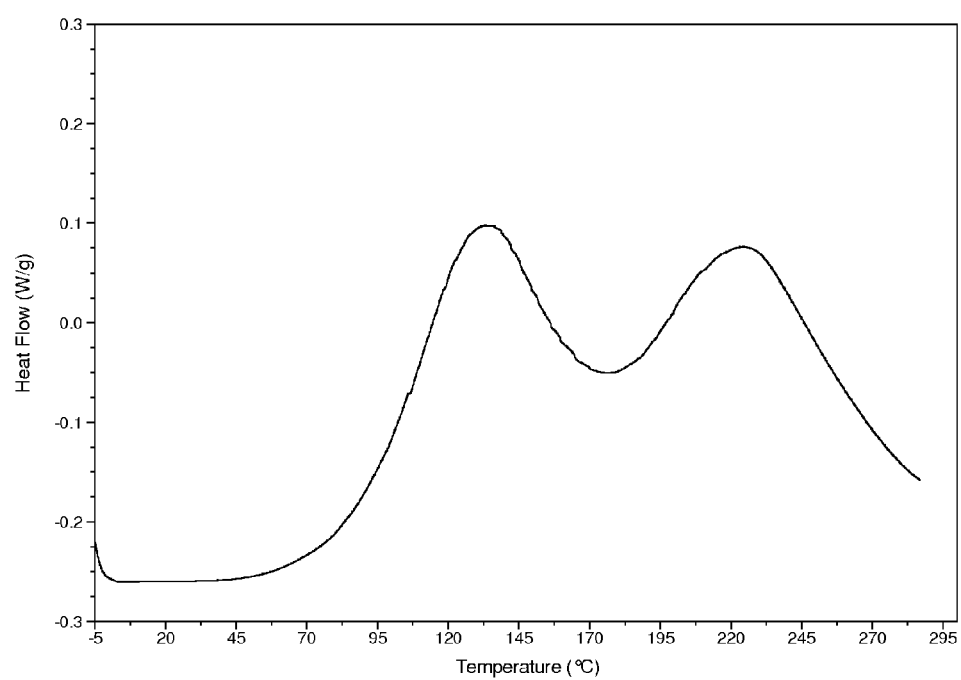
FIG. 5 is a thermogram via DSC of an example of a composition of the present invention starting with a mixture of DVBDO, bisphenol A and DETDA.

With reference to FIG. 5, there is shown a thermogram via DSC of an example of the composition of the present invention starting with a mixture of DVBDO, Bisphenol A and DETDA. In the thermogram, the mixture is heated at a rate of 10° C./minute from −5° C. to 295° C. The thermogram shows two exotherms a distinct temperatures, the low temperature exotherm with a peak at $T_1$=131° C. and the high temperature exotherm with a peak at $T_2$=227° C.

Figure 8:
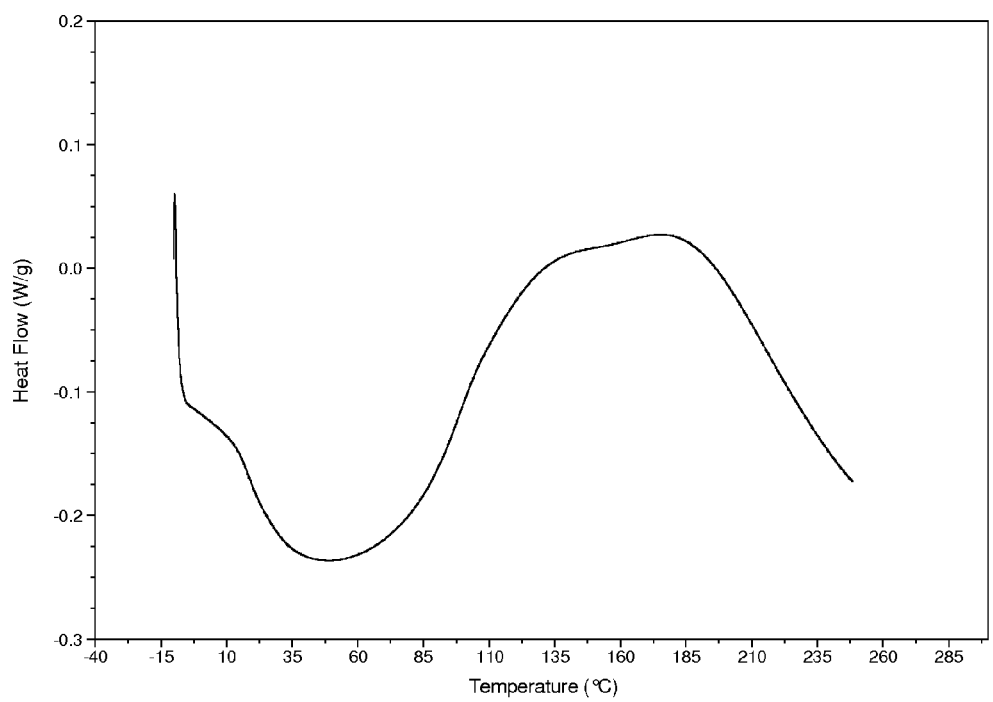
FIG. 8 is a thermogram via DSC of an example of a composition starting with a mixture of DER 383, DETA and DETDA.

With reference to FIG. 8, there is shown a thermogram via DSC of an example of the composition of the present invention starting with a mixture of DER 383, DETA and DETDA. In the thermogram, the mixture was heated at a rate of 10° C./minute from −15° C. to 270° C. The thermogram does not exhibit the desired marked partition of exotherms. In fact, the peaks are overlapped and only one exotherm is shown.

Figure 6:
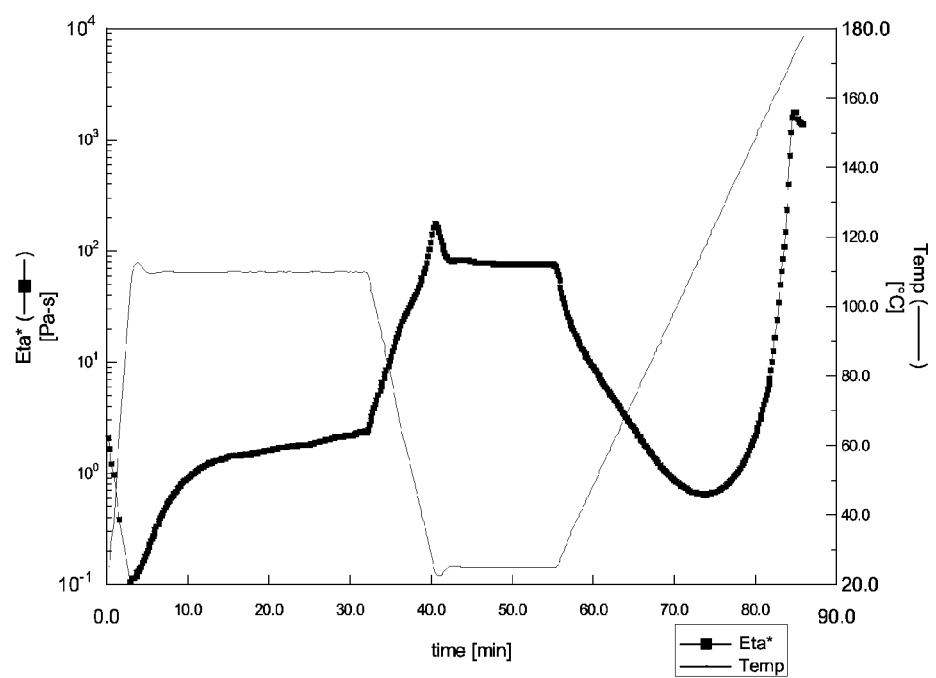
FIG. 6 is a rheology curve of the viscosity at B-staging of an example of a composition of the present invention starting with a mixture of DVBDO, DETA and DETDA.
Figure 7:
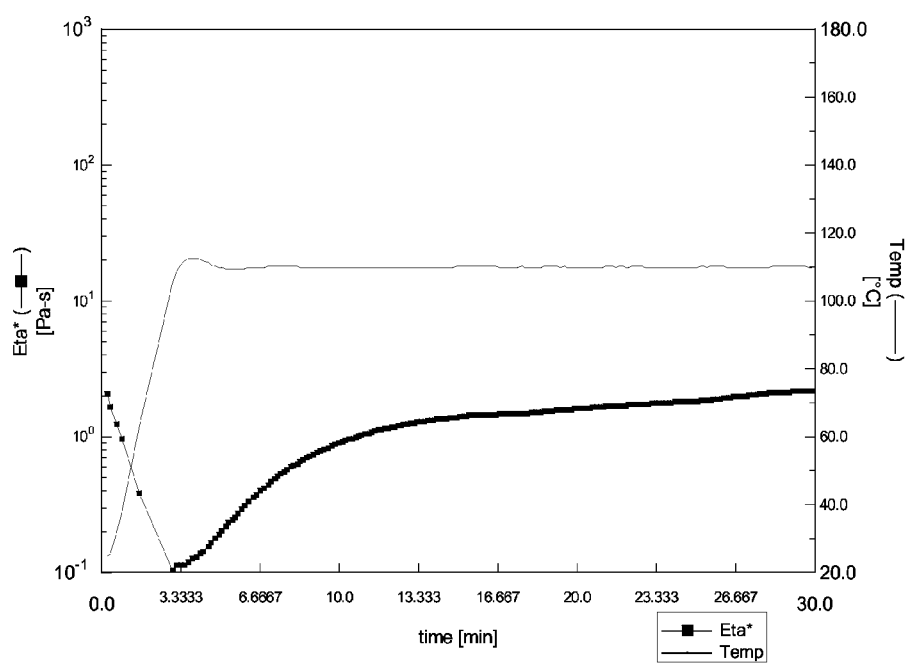
FIG. 7 is a portion of the rheology curve of FIG. 6 showing the first 30 minutes of the curve.

With reference to FIG. 6, there is shown a rheology curve of the viscosity at B-staging of an example of the composition of the present invention starting with a mixture of DVBDO, DETA and DETDA. FIG. 6 shows the viscosity change as a function of time for the composition containing DVBDO, DETA and DETDA. The testing parameters consisted of ramping the sample at 30° C./minute from 25° C. to 110° C.; holding isothermally at 110° C. for 30 minutes; cooling at 5° C./minute to 25° C. with an isothermal time of 15 minutes followed by a ramp at 5° C./minute until the composition gelled at 172° C.

Figure 9:
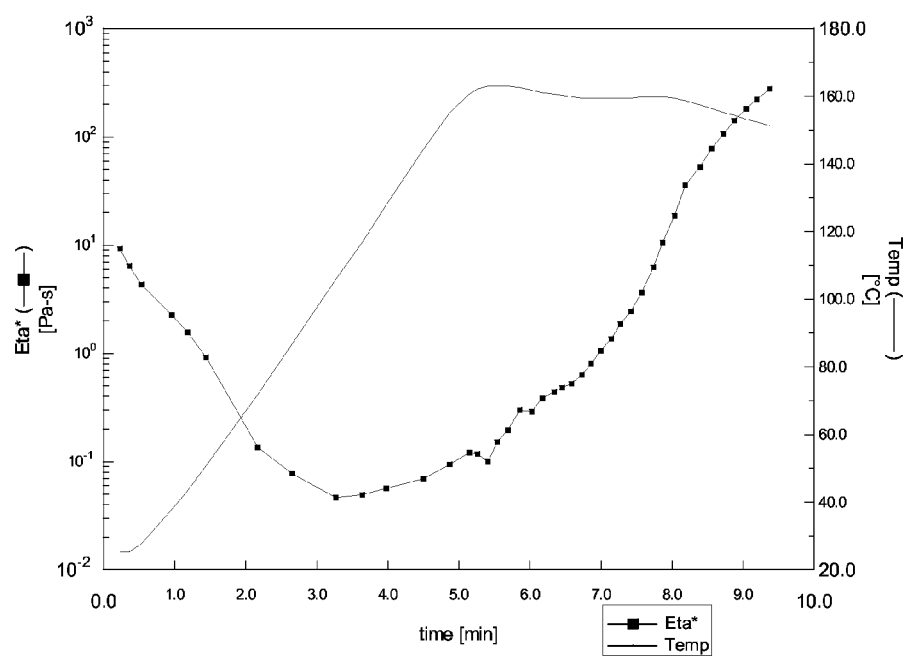
FIG. 9 is a rheology curve of the viscosity at B-staging of an example of a composition starting with a mixture of XZ92530, XZ92535 and 2-Phenyl imidazole.

With reference to FIG. 9, there is shown a rheology curve of the viscosity at B-staging of an example starting with a mixture of XZ92530, XZ92535 and 2-Phenyl imidazole. FIG. 9 shows the viscosity change as a function of time for the composition containing XZ92530, XZ92535 and 2-Phenyl imidazole. The testing parameters consisted of ramping the sample at 30° C./minute from 25° C. to 160° C.; next holding isothermally at 160° C. until the composition gelled after 3 minutes at 160° C.

The thermoset product of the present invention (i.e. the cross-linked product made from the composition of the present invention) shows several improved properties over conventional epoxy cured resins. For example, the cured product of the present invention (i.e., the C-staged material) may have a glass transition temperature (Tg) generally from 50° C. to 300° C. in one embodiment; from 100° C. to 250° C. in another embodiment; from 120° C. to 230° C. in yet another embodiment; from 140° C. to 200° C. in still another embodiment; and from 160° C. to 180° C. in one other embodiment. The Tg may be measured using a differential scanning calorimeter by scanning at 10° C./minute. The Tg is determined by the inflection point of the $2^{nd}$ order transition.

The curable composition of the present invention may be used in thermoset compositions where conventional curable epoxy resins are used. Some non-limiting examples of applications wherein the composition of present invention may be used include, for example, prepregs, electrical laminates, resin coated copper, resin coated film, composites, films, underfills (capllilary underfills), coatings, castings, civil engineering materials, adhesives, or elastomers. For example, the composition may be used in composites for aerospace, infrastructure, sporting goods, transportation vehicles including car, trucks, boats and ships, liquid and gas containers. In another example, prepregs prepared using the curable compositions of the present invention are also suitable for field repairs (such as military vehicles) where storage life under ambient conditions is needed.

In one embodiment, prepregs, electrical laminates, and composites may include additives such as fillers, dyes, pigments, adhesion promoters, wetting agents, flow-aids, anti-gloss or gloss additives, toughening agents, flame retardants, and mixtures thereof, can be used for making composite compositions which in turn are used for manufacturing a cured composite article. In another embodiment, underfills may include additives such as fillers, pigments, adhesion promoters, wetting agents, toughening agents and mixtures thereof can be used for making underfill compositions which in turn are used for manufacturing a cured underfill article.

EXAMPLES

The following examples further illustrate the present invention in detail but are not to be construed to limit the scope thereof.

Various terms and designations used in the following examples are explained herein below:

"DVBDO" stands for divinylbenzene dioxide; "DETA" stands for diethylene triamine; "DETDA" stands for diethyl-toluenediamine; "2-PI" stands for 2-phenyl imidazole; and "FR-4" stands for Flame Retardant Class 4.

"XZ92530" is a solution of a polyglycidyl ether resin containing a phosphorous moiety, commercially available from The Dow Chemical Company; and "XZ92535" is a solution of a multi-functional phenol novolac hardener, commercially available from The Dow Chemical Company.

The following standard analytical equipment and methods are used in the Examples:

Analytical:

Differential scanning calorimetry (DSC) is performed using the following instruments: TA Instrument DSC Q200, DSC Q2000, DSC 2920 and using the following process:

DSC is carried out using ASTM E 1269 Standard Test Method for determining specific heat capacity, and ASTM E 1356 standard test method for assignment of the glass transitions temperatures by differential scanning calorimetry. The samples are run in a TA Instrument DSC Q2000.

Samples of approximately 10 mg are cut from cured plaques, or in the case of liquid samples, aliquots of the sample are drawn and loaded into aluminum pans that were hermetically sealed. The pans are loaded into an auto sampler on a TA Instruments Q2000 DSC. The samples are cooled to −20° C., ramped at 10° C./minute to 200° C., equilibrated again at −10° C., then ramped a second time to 250° C. at a rate of 10° C./minute.

Minimum melt viscosity data and dynamic mechanic analysis (DMA) tests are performed using a TA Instrument ARES Rheometer; and using the following process: Sample viscosity is tested using parallel plate fixtures on a TA Instruments ARES Rheometer. A 40 mm top and 50 mm bottom plate are installed on the rheometer to test the samples. One example of the testing parameters consists of ramping the sample at 5° C./minute from ambient temperature to 80° C., ramping again at 5° C./minute to 25° C. with an isothermal time of 15 minutes followed by a third ramp at 5° C./minute until the composition gelled using the oven control and attached liquid nitrogen supply. The gap is set at 1.000 mm and all samples were run at a strain of 100% and frequency of 1 Hertz.

Example 1

A solvent-free dual-cure composition containing DVBDO, DETA and DETDA was prepared. In this Example 1, the two separate reactions taking place at different temperatures are (1) the reaction between DVBDO and DETA, which takes place upon applying a low temperature; and (2) the reaction between DVBDO and DETDA which occurs at high temperature.

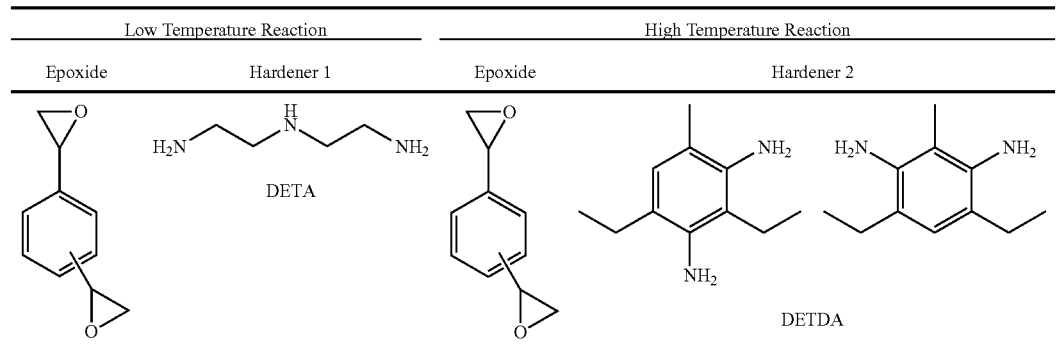

General Preparation Procedure

A composition containing DETA, DETDA and DVBDO was prepared according to the following general procedure: Since all the materials were completely soluble at ambient temperature (20° C. to 30° C.), no heating of the composition was necessary to obtain a homogeneous mixture. A total of 5 g of composition were prepared in a 4 mL glass vial by first adding 1.47 g (33 mmol) of DETDA, and then adding 3.35 g (41 mmol) of DVBDO to the glass vial. The resulting mixture was stirred to mix thoroughly. Then, 0.17 g (8 mmol) of DETA was added to the mixture in the glass vial and the resulting mixture was stirred to obtain a low viscosity composition having a viscosity of 0.1 Pa-s.

General Curing Procedure

In order to B-stage the low viscosity composition prepared above, 2 g of the low viscosity composition were placed in an aluminum 2 inches in diameter (5 centimeters (cm)) disposable pan. The 2 g sample of the composition was B-staged in an oven at 110° C. for 1 hour.

Next, the resultant B-staged material was fully cured utilizing the following curing schedule: 160° C. for 30 minutes, 200° C. for 40 minutes and 210° C. for 40 minutes.

Characterization of the Composition Sample

Each stage of the process of this Example 1 was characterized by DSC. The DSC scan of the A-stage material (measured right after mixing of all components at ambient temperature), showed the marked partition of the reaction exotherms corresponding to the decoupling of reactions of each hardener with DVBDO. An exotherm peak with a maximum at 111° C. corresponding to the reaction of DETA and DVBDO was found. A second exotherm peak at 196° C. corresponding to the reaction of DETDA with DVBDO was also found.

To confirm the decoupling of reactions, the composition was placed in the oven at 110° C. for 1 hour to perform the A-to-B stage. A DSC scan obtained after B-staging the composition showed that the reaction of DETA and DVBDO had gone to completion which was evidenced by the complete disappearance of the first peak. On the other hand, the second peak was still present and about unchanged in the spectrum supporting the presence of unreacted DETDA and DVBDO in the B-staged material.

The B-staged material prepared above was then cured in an oven at a curing schedule of 160° C., 200° C. and 210° C. to perform the B-stage-to-C-stage. A DSC scan of the resulting C-stage thermoset was obtained and a high Tg of the fully cured thermoset was determined by DMTA analysis. The Tg of the C-stage thermoset was found to be 225° C.

The composition of Example 1 is characterized in FIG. 1, FIG. 2 and FIG. 3. FIG. 1 shows a graphical illustration of the characterization of the stages of the present invention via DSC. The first thermogram shown in FIG. 1 was conducted on the composition of Example 1 (which represents a typical mixture in the A-stage) that is heated at a rate of 10° C./minute from 30° C. to 275° C. The thermogram shows two exotherms at distinct temperatures, the low temperature exotherm with a peak at $T_1$=111° C. and the high temperature exotherm with a peak at $T_2$=196° C. The second thermogram shown in FIG. 2 is a similar temperature ramp scan, but the sample has been preheated at 110° C. for 60 minutes to represent a typical B-stage material. Only one exotherm peak at high temperature (190° C.) is observed. The third thermogram shown in FIG. 3 was conducted on a fully cured sample (typically representing a C-stage material) after heating the sample at 210° C. for 120 minutes. No exotherm was observed on this DSC scan.

Example 2

The following is a detailed description of the preparation of 80 g of composition for "hand paint"-technique laminate. First, 40 g (0.50 mol) of DVBDO were warmed up to 55° C., and 28 g (0.25 mol) of powdered bisphenol A were added in multiple portions over 40 minutes. During the addition of bisphenol A, the temperature was gradually increased to 95° C. to help dissolve the phenolic hardener in the epoxide. The reaction mixture was vigorously stirred using a mechanical stirrer to obtain a homogeneous mixture. The resulting mixture was then cooled to ambient temperature, and 11 g (0.25 mol) of DETDA were added to the mixture.

The composition was applied using a brush onto 12 inches by 12 inches (30 cm×30 cm) sheets of glass cloth. The composition was B-staged in the oven at 80° C. for 60 minutes. Next, the prepregged glass sheets were stacked on top of each other, and pressed according to the following cycle: At 25° C. at 8 psi (800 lbs/sq inch), followed by a heating ramp rate of 5° C. per minute up to 160° C. At 160° C., the pressure is increased to 20 psi (2,000 lbs). The heating rate is increased to 20 degrees per minute from 160° C. up to 200° C. The pressure is held at 200° C. until full cure of the resin is achieved.

The composition of this Example 2 is characterized in FIG. 5. FIG. 5 shows a graphical illustration of the characterization of the stages of the present invention via DSC. The thermogram shown in FIG. 5 was conducted on the composition of Example 2 (which represents a typical mixture in the A-stage) that is heated at a rate of 10° C./minute from −5° C. to 295° C. The thermogram shows two exotherms at distinct temperatures, the low temperature exotherm with a peak at $T_1$=131° C. and the high temperature exotherm with a peak at $T_2$=227° C.

Example A

The epoxy resin employed in this Example A was DER 383 (liquid epoxy resin). The amine hardeners selected were DETA and DETDA. The experimental preparation procedure followed in this Example A is as described in Example 1 of the present invention. The solvent-free composition was prepared utilizing 1 to 1 ratio of DER 383 epoxy to amine hardeners. 1.7 g (9.4 mmol) of DER 383 was mixed at ambient temperature with 0.21 g (4.7 mmol) of DETDA, followed by 0.097 g (4.7 mmol) of DETA.

Example A is characterized in FIG. 9. FIG. 9 shows a graphical illustration of the characterization of the stages of the present invention via DSC. The thermogram shown in FIG. 9 was conducted on the composition of Example A (which represents a typical mixture in the A-stage) that is heated at a rate of 10° C./minute from −15° C. to 270° C. The thermogram does not exhibit the desired marked partition of exotherms. Instead, FIG. 9 shows that the peaks are overlapped and only one exotherm is obtained.

Example 3

In this Example 3, a composition comprising one epoxy resin and two amine hardeners was investigated. The epoxy resin employed was D.E.R. 383 and the two hardeners employed were DETA as the first hardener and 1-(o-tolyl)-biguanide as the second hardener. A 1 to 1 molar ratio of epoxy to hardeners was employed. The molar ratio of the hardeners DETA to 1-(o-tolyl)-biguanide was 1 to 3 respectively. 0.06 g (4 mmol) of 1-(o-tolyl)-biguanide were dissolved in 0.91 g (5 mmol) of DER 383 at 75° C. over 40 minutes. The mixture was cooled down to ambient temperature and 0.03 g (1 mmol) of DETA was added to the mixture. The resulting composition was mixed thoroughly.

Example 4

The composition of this Example 4 was prepared employing one epoxy resin, DEN 438, and two different hardeners DETA and DETDA. 1.39 g (7.40 mmol) of DEN 438 were warmed up to 70-80° C. and combined with 0.26 g (5.91 mmol) DETDA. The mixture was stirred vigorously until the mixture became homogeneous. The resulting mixture was cooled down to ambient temperature and 0.031 g (1.48 mmol) DETA was added.

The composition of Example 4 is characterized in FIG. 4. FIG. 4 shows a graphical illustration of the characterization of the stages of the present invention via DSC. The thermogram in FIG. 4 was conducted on the Example 4 composition (which represents a typical mixture in the A-stage) that is heated at a rate of 10° C./minute from −25° C. to 295° C. The thermogram shows two exotherms a distinct temperatures, the low temperature exotherm with a peak at $T_1=103°$ C. and the high temperature exotherm with a peak at $T_2=192°$ C.

Example 5

The composition of this Example 5 was prepared employing one epoxy resin, DER 354 (bisphenol F based epoxy resin); and two different hardeners DETA and DETDA. The composition was mixed and prepared at ambient temperature. 0.50 g (2.99 mmol) of DER 354 was mixed with 0.11 g (2.40 mmol) of DETDA at ambient temperature. The resulting mixture was mixed until homogeneous, followed by addition at ambient temperature of 0.012 g (0.60 mmol) of DETA.

Example 6

The composition of this Example 6 was prepared employing a cycloaliphatic epoxy resin (a diglycidyl ether of Unoxol Diol); and two different hardeners DETA and DETDA. The composition was mixed at ambient temperature. 0.50 g (3.9 mmol) of Unoxol Diol DGE was mixed at ambient temperature with 0.14 g (3.11 mmol) of DETDA. The mixture was mixed until the mixture became homogeneous. Then, 0.016 g (0.78 mmol) of DETA was added to the mixture, and the resulting mixture was stirred thoroughly.

Example B

In this Example B, a typical composition for FR-4 laminate production was investigated. A solvent-containing composition is made up of XZ92530, a resin solution, and cured with XZ92535, a phenolic novolac curing agent solution. This composition contains an accelerator, 2-PI. The ratio of XZ92530:XZ92535:2-PI was 77.1:22.9:0.4. The actual amounts of materials employed in the preparation of the compositions were 314.9 g of XZ92530, 128.7 g of XZ92535 and 6.31 g of 2-PI.

Typical processing conditions for this type of solvent-containing composition include B-staging at 177° C. for 3 minutes.

As a comparison, the solvent-free composition described in Example 1 of the present invention, containing DVBDO, DETA and DETDA was B-staged at 110° C. for 30 minutes. The compositions from Example 1 and Example A were tested in an ARES rheometer to evaluate the increase in viscosity as a function of time at the B-staging temperature of each of the compositions.

Even though the processing conditions for the solvent-containing composition and the solvent-free composition are different, the viscosity of both samples at the B-staging temperature was tested in the ARES rheometer using the following methods:

For the composition containing DVBDO, DETA and DETDA the testing parameters consisted of ramping the sample at 30° C./minute from ambient temperature to 110° C.; isothermal at 110° C. for 30 minutes; cooling at 5° C./minute to 25° C. with an isothermal time of 15 minutes followed by a ramp at 5° C./minute until the composition gelled at 172° C. (FIG. 6).

For the composition containing XZ92530, XZ92535 and 2-PI the testing parameters consisted of ramping the sample at 30° C./minute from ambient temperature to 160° C.; isothermal at 160° C. until the composition gelled after 3 minutes at 160° C. (FIG. 9).

The results for the viscosity change as a function of time at the B-staging temperature for DVBDO, DETA and DETDA and for XZ92530, XZ92535 and 2-PI are also summarized in Table I.

TABLE I

| Amount of B-staging Time (minutes) | Example A Viscosity (Pa-s) | Example A Temperature* (° C.) | Example 1 Viscosity (Pa-s) | Example 1 Temperature* (° C.) |
|---|---|---|---|---|
| 0 | 9.22 | 25.3 | 2.1 | 25.0 |
| 1 | 2.30 | 37.7 | 0.96 | 37.9 |
| 2 | 0.13 | 71.7 | 0.38 | 63.4 |
| 3 | 0.047 | 106 | 0.11 | 108.6 |
| 4 | 0.057 | 127 | 0.13 | 112.6 |
| 5 | 0.12 | 160 | 0.20 | 109.7 |
| 6 | 0.29 | 161 | 0.31 | 109.5 |
| 7 | 1.1 | 160 | 0.46 | 110 |
| 8 | Gel | 160 | 0.62 | 110 |
| 9 | Gel | 160 | 0.77 | 110 |
| 10 | | | 0.92 | 110 |
| 15 | | | 1.41 | 110 |
| 20 | | | 1.61 | 110 |
| 25 | | | 1.82 | 110 |
| 30 | | | 2.17 | 110 |

*Reading in the ARES Rheometer

According to Table I, upon B-staging the composition containing XZ92530, XZ92535, 2-PI (Example B) at 160° C., the composition undergoes a large increase in viscosity and quickly gels after only 3 minutes at 160° C. (FIG. 9). On the other hand, the solvent-free composition containing DVBDO, DETA and DETDA (Example 1), was B-staged for up to 30 minutes at 110° C. The composition of Example 1 does not gel after 30 minutes isothermally at 110° C. (FIG. 6).

The invention claimed is:

1. A curable epoxy resin composition comprising (a) at least one epoxy resin; and (b) at least one hardener; wherein the curable epoxy resin composition is at least a three-component composition, such that the three-component composition includes (i) (a1) at least a first epoxy resin; and (a2) at le second epoxy resin different from the first epoxy resin and at least one hardener component (b); or (ii) at least one epoxy resin component (a) and (b1) at least a first hardener, and (b2) at least a second hardener different from the first hardener; wherein the curable epoxy resin composition has at least two exotherm peaks representing at least two distinct chemical reactions and wherein the exothermic peak difference of the two exotherm peaks, when measured by differential scanning calorimetry with a heating rate of 10° C./minute, is greater than or equal to 20° C. and sufficient to allow the curable epoxy resin composition to be B-staged.

2. The composition of claim 1, wherein the at least one epoxy resin component (a) comprises (a1) at least a first epoxy resin; and (a2) at least a second epoxy resin different from the first epoxy resin; and wherein the at least one hardener comprises at least a first hardener component (b).

3. The composition of claim 1, wherein the at least one epoxy resin component (a) comprises at least a first epoxy resin: and wherein the at least one hardener component (b) comprises (b1) at least a first hardener, and (b2) at least a second hardener different from the first hardener.

4. The composition of claim 3, wherein the molar ratio of the first hardener to the second hardener is from 0.001 to 1,000.

5. The composition of claim 3, wherein each of the first and second hardeners contain reactive amine hydrogens.

6. The composition of claim 3, wherein the first hardener contains reactive amine hydrogens and the second hardener contains reactive phenol hydrogens.

7. The composition of claim 1, wherein the composition has a viscosity of less than 50,000 mPa-s under processing conditions of the B-stageable composition.

8. The composition of claim 2, wherein the first epoxy resin; and the second epoxy resin each separately and individually is selected from the group consisting of a divinylarene dioxide, a polyglycidyl ether, or a combination thereof.

9. The composition of claim 3, wherein the first and second hardeners each separately and individually is selected from the group consisting of aliphatic amines, aromatic amines, cycloaliphatic amines, carbodiimides, ureas, guanidines, phenols, aliphatic alcohols, mercaptans, anhydrides, and mixtures thereof.

10. The composition of claim 1, wherein the at least two distinct chemical reactions that the composition is capable of undergoing is first a B-staging reaction and second a C-staging reaction, wherein the B-staging reaction and the C-staging reaction are two distinct chemical reactions.

11. The composition of claim 10, wherein the B-staging takes place at a first temperature, $T_1$; and the C-staging takes place at a second temperature, $T_2$; wherein $T_2$ is different from $T_1$; and wherein $T_2$ is a higher temperature than $T_1$.

12. The composition of claim 11, wherein $T_1$ is greater than or equal to 20° C. and $T_2$ is greater than 20° C. but less than 300° C.

13. A process comprising the steps of:
(i) coating reinforcing fibers with a composition of claim 1, and
(ii) B-staging the composition coating the reinforcing fibers of step (i) to form a prepreg.

14. The process of claim 13, including step (iii) C-staging the prepreg of step (ii) to form a laminate.

* * * * *